US011145075B2

(12) United States Patent
Valentin et al.

(10) Patent No.: US 11,145,075 B2
(45) Date of Patent: Oct. 12, 2021

(54) DEPTH FROM MOTION FOR AUGMENTED REALITY FOR HANDHELD USER DEVICES (71) Applicant: Google LLC, Mountain View, CA (US)

(72) Inventors: Julien Valentin, Mountain View, CA (US); Onur G. Guleryuz, San Francisco, CA (US); Mira Leung, Seattle, WA (US); Maksym Dzitsiuk, San Francisco, CA (US); Jose Pascoal, Lisbon (PT); Mirko Schmidt, San Francisco, CA (US); Christoph Rhemann, Marina Del Rey, CA (US); Neal Wadhwa, Mountain View, CA (US); Eric Turner, Somerville, MA (US); Sameh Khamis, Oakland, CA (US); Adarsh Prakash Murthy Kowdle, San Francisco, CA (US); Ambrus Csaszar, San Francisco, CA (US); João Manuel Castro Afonso, Lisbon (PT); Jonathan T. Barron, Alameda, CA (US); Michael Schoenberg, San Francisco, CA (US); Ivan Dryanovski, Mountain View, CA (US); Vivek Verma, Oakland, CA (US); Vladimir Tankovich, San Francisco, CA (US); Shahram Izadi, Tiburon, CA (US); Sean Ryan Francesco Fanello, San Francisco, CA (US); Konstantine Nicholas John Tsotsos, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/767,401

(22) PCT Filed: Oct. 4, 2019

(86) PCT No.: PCT/US2019/054696
§ 371 (c)(1),
(2) Date: May 27, 2020

(87) PCT Pub. No.: WO2020/072905
PCT Pub. Date: Apr. 9, 2020

(65) Prior Publication Data
US 2021/0004979 A1 Jan. 7, 2021

Related U.S. Application Data (60) Provisional application No. 62/741,256, filed on Oct. 4, 2018.

(51) Int. Cl.
G06T 7/579 (2017.01)
G06T 19/00 (2011.01)
G06T 7/571 (2017.01)

(52) U.S. Cl.
CPC ............ *G06T 7/579* (2017.01); *G06T 19/006* (2013.01); *G06T 7/571* (2017.01)

(58) Field of Classification Search
CPC ........ G06T 7/579; G06T 7/571; G07T 19/006
See application file for complete search history.

(56) References Cited

U.S. PATENT DOCUMENTS

2012/0306850 A1\* 12/2012 Balan .................... G06F 3/0304
345/419

OTHER PUBLICATIONS

Schöps, T. et al., "Large-Scale Outdoor 3D Reconstruction on a Mobile Device", Computer Vision and Image Understanding, 157; Apr. 2017; pp. 151-166.

(Continued)

*Primary Examiner* — Girumsew Wendmagegn (57) ABSTRACT

A handheld user device includes a monocular camera to capture a feed of images of a local scene and a processor to select, from the feed, a keyframe and perform, for a first image from the feed, stereo matching using the first image, the keyframe, and a relative pose based on a pose associated (Continued)

with the first image and a pose associated with the keyframe to generate a sparse disparity map representing disparities between the first image and the keyframe. The processor further is to determine a dense depth map from the disparity map using a bilateral solver algorithm, and process a viewfinder image generated from a second image of the feed with occlusion rendering based on the depth map to incorporate one or more virtual objects into the viewfinder image to generate an AR viewfinder image. Further, the processor is to provide the AR viewfinder image for display.

20 Claims, 5 Drawing Sheets (56) References Cited

OTHER PUBLICATIONS

Schöps, T. et al., "Real-Time View Correction for Mobile Devices", IEEE Transactions on Visualization and Computer Graphics; Aug. 2017; pp. 2455-2462.
Schöps, T. et al., "Semi-Dense Visual Odometry for AR on a Smartphone", 2014 IEEE International Symposium on Mixed and Augmented Reality (ISMAR); Sep. 2014; pp. 145-150.
Shen, J. et al., "Mathematical Models for Local Nontexture Inpaintings", SIAM Journal on Applied Mathematics, 62(3); 2002; pp. 1019-1043.
Suwajanakorn, S. et al., "Depth from Focus with Your Mobile Phone", Proceedings of the IEEE Conference on Computer Vision and Pattern Recognition; Jun. 2015; pp. 3497-3506.
Tanskanen, P., "Live Metric 3D Reconstruction on Mobile Phones", Proceedings of the IEEE International Conference on Computer Vision; Dec. 2013; pp. 65-72.
Van Den Oord, A. et al,. "Conditional Image Generation with PixelCNN Decoders" In Proceedings of the 30th International Conference on Neural Information Processing Systems; 2016; pp. 4797-4805.
Van Waveren, J.M.P., "The Asynchronous Time Warp for Virtual Reality on Consumer Hardware", Proceedings of the 22nd ACM Conference on Virtual Reality Software and Technology; Nov. 2016; pp. 37-46.
Wadhwa, N. et al., "Synthetic Depth-of-Field with a Single-Camera Mobile Phone", ACM Transactions on Graphics (TOG), 37(4); Jul. 2018; pp. 1-13.
Wang, C. et al., "Comparison of Local Plane Fitting Methods for Range Data", Proceedings of the 2001 IEEE Computer Society Conference on Computer Vision and Pattern Recognition; Apr. 2003.
Weerasekera, CS et al., "Just-in-Time Reconstruction: Inpainting Sparse Maps using Single View Depth Predictors as Priors",2018 IEEE International Conference on Robotics and Automation (ICRA); May 2018; pp. 1-9.
Woodford, O. et al., "Global Stereo Reconstruction under Second-Order Smoothness Priors", IEEE transactions on pattern analysis and machine intelligence, 31(12); Jun. 2009; pp. 2115-2128.
Zhang, C. et al., "As-Rigid-As-Possible Stereo under Second Order Smoothness Priors", European Conference on Computer Vision; Sep. 2014; pp. 112-126.
Zhang, D. et al., "Single-trial ERPs elicited by visual stimuli at two contrast levels: Analysis of ongoing EEG and latency/amplitude jitters", 2012 IEEE Symposium on Robotics and Applications (ISRA); Jun. 2012.
Zhou, T. et al., "Unsupervised Learning of Depth and Ego-Motion from Video", Proceedings of the IEEE Conference on Computer Vision and Pattern Recognition; Nov. 2017; pp. 1851-1858.
Anderson, R. et al., "Jump: Virtual Reality Video", ACM Transactions on Graphics, Nov. 2016, 13 pages.
Apple, "ARKit—Apple Developer Documentation", 2018; accessed on Jun. 10, 2020 from <<https://developer.apple.com/documentation/arkit>>; 6 pages.
Bailer, C. et al., "Scale robust multi view stereo", In European Conference on Computer Vision; Oct. 7, 2012; Springer; pp. 398-411.
Barnes, C. et al., "Patch-Match: A randomized correspondence algorithm for structural image editing", ACM Transactions on Graphics, Jul. 27, 2009; vol. 28, No. 3; 12 pages.
Barron, J. et al., "Fast Bilateral-Space Stereo for Synthetic Defocus", In Proceedings of the IEEE Conference on Computer Vision and Pattern Recognition Jun. 2015; pp. 4466-4474.
Bleyer, M. et al., "PatchMatch Stereo-Stereo Matching with Slanted Support Windows", In Bmvc; Aug. 29, 2011; vol. 11; pp. 1-11.
Boykov, Y. et al., "Fast Approximate Energy Minimization via Graph Cuts", IEEE Transactions on Pattern Analysis and Machine Intelligence; Nov. 23, 2011; 23(11); pp. 1222-1239.
Bradski, G. et al., "OpenCV", Dr. Dobb's Journal of Software Tools, 3; 2000; 81 pages.
Choudhury, P. et al., "The Trilateral Filter for High Contrast Images and Meshes", In ACM SIGGRAPH 2005 Courses; Jul. 32, 2005; 12 pages.
Criminisi, A. et al., "Decision Forests: A Unified Framework for Classification, Regression, Density Estimation, Manifold Learning and Semi-Supervised Learning", Foundations and Trends® in Computer Graphics and Vision Feb. 2012; https://doi.org/10.1561/0600000035; 150 pages.
Eigen, D. et al., "Depth Map Prediction from a Single Image Using a Multi-Scale Deep Network", In Advances in Neural Information Processing Systems, 2014; pp. 2366-2374.
Evangelakos, D. et al., "Extended TimeWarp Latency Compensation for Virtual Reality", Proceedings of the 20th ACM SIGGRAPH Symposium on Interactive 3D Graphics and Games; Feb. 26-28, 2016; pp. 193-194.
Fanello, S. et al., "Low Compute and Fully Parallel Computer Vision with HashMatch", In 2017 IEEE International Conference on Computer Vision (ICCV); Oct. 22, 2017; pp. 3894-3903.
Fanello, S. et al., "UltraStereo: Efficient Learning-based Matching for Active Stereo Systems", In 2017 IEEE Conference on Computer Vision and Pattern Recognition (CVPR); Jul. 21, 2017; pp. 6535-6544.
Faugeras, O. et al., "The Geometry of Multiple Images: The Laws That Govern the Formation of Images of a Scene and Some of Their Applications", MIT Press, 2001; 9 pages.
Furukawa, Y. et al., "Manhattan-World Stereo", 2009 IEEE Conference on Computer Vision and Pattern Recognition; Jun. 20, 2009; pp. 1422-1429.
Garg, R. et al. "Unsupervised cnn for single view depth estimation: Geometry to the rescue", In European Conference on Computer Vision; Oct. 8, 2016; pp. 740-756.
Godard, C. et al., "Unsupervised Monocular Depth Estimation With Left-Right Consistency", Proceedings of the IEEE Conference on Computer Vision and Pattern Recognition; 2017; pp. 270-279.
Google, "ARCore Overview", Google Developers Documentation, 2018; accessed on Jun. 23, 2020 from <<https://developers.google.com/ar/discover>>, 3 pages.
Hamzah, R.A. et al., "Literature survey on stereo vision disparity map algorithms", Journal of Sensors; vol. 2016; 2016; 24 pages.
Hartley, R. et al., "Multiple View Geometry in Computer Vision: Second Edition", 2003; Cambridge University Press; 16 pages.
Hartley, R. et al., "Triangulation", Computer Vision and Image Understanding, vol. 68, No. 2; Nov. 1997; pp. 146-157.
Hosni, A. et al., "Temporally consistent disparity and optical flow via efficient spatio-temporal filtering", Pacific-Rim Symposium on Image and Video Technology; Nov. 20, 2011; pp. 165-177.
Jain, R. et al., "Motion Stereo Using Ego-Motion Complex Logarithmic Mapping", IEEE Transactions on Pattern Analysis and Machine Intelligence 3; May 1987; pp. 356-369.
Kähler, O. et al., "Very high frame rate volumetric integration of depth images on mobile devices", IEEE Transactions on Visualization and Computer Graphics; Jul. 2015; pp. 1241-1250.

(56) References Cited

OTHER PUBLICATIONS

Karsch, K. et al., "Depth Transfer: Depth Extraction from Videos Using Nonparametric Sampling", Dense Image Correspondences for Computer Vision; 2016; pp. 173-205.
Kendall, A., et al., "End-to-End Learning of Geometry and Context for Deep Stereo Regression", Proceedings of the IEEE International Conference on Computer Vision; Oct. 2017; pp. 66-75.
Kim, H. et al., "Real-time 3D reconstruction and 6-DoF tracking with an event camera", European Conference on Computer Vision; Oct. 2016; pp. 349-364.
Klasing, K. et al., "Comparison of surface normal estimation methods for range sensing applications", 2009 IEEE International Conference on Robotics and Automation; May 2009; pp. 3206-3211.
Kolev, K. et al., "Turning Mobile Phones into 3D Scanners", Proceedings of the IEEE Conference on Computer Vision and Pattern Recognition; Jun. 2014; pp. 3946-3953.
Li, P. et al., "On creating depth maps from monoscopic video using structure from motion", IEEE Workshop on Content Generation and Coding for 3D-Television; Jun. 2006; pp. 508-515.
Liu, F. et al., "Learning depth from single monocular images using deep convolutional neural fields", IEEE transactions on pattern analysis and machine intelligence 38, No. 10; Dec. 2015; pp. 2024-2039.
Loop, C. et al., "Computing rectifying homographies for stereo vision", Proceedings. 1999 IEEE Computer Society Conference on Computer Vision and Pattern Recognition (Cat. No. PR00149), vol. 1; Jun. 1999; pp. 125-131.
Mazumdar, A. et al., "A Hardware-friendly Bilateral Solver for Real-time Virtual Reality Video", Proceedings of High Performance Graphics; Jul. 2017; pp. 1-10.
Mine, M. et al., "Just-in-time pixels", University of North Carolina at Chapel Hill Technical Report TR93-005; Mar. 1993; 5 pages.
Mühlmann, K. et al., "Calculating dense disparity maps from color stereo images, an efficient implementation", International Journal of Computer Vision 47, No. 1-3; Apr. 2002; pp. 79-88.
Nevatia, R., "Depth Measurement by Motion Stereo", Computer Graphics and Image Processing; vol. 5, Issue 2; Jun. 1976; pp. 203-214.
Newcombe, R. A. et al., "DTAM: Dense tracking and mapping in real-time", 2011 IEEE International Conference on Computer Vision; Nov. 2011; pp. 2320-2327.
Oliveira, M. et al., "Fast Digital Image Inpainting", Proceedings of the International Conference on Visualization, Imaging and Image Processing (VIIP 2001), Marbella, Spain; Sep. 2001; pp. 106-107.
Ondrúška, P. et al., "Mobilefusion: Real-time volumetric surface reconstruction and dense tracking on mobile phones", IEEE Transactions on Visualization and Computer Graphics; Jul. 2015; pp. 1251-1258.
Pan, L. et al., "Depth Map Completion by Jointly Exploiting Blurry Color Images and Sparse Depth Maps", 2018 IEEE Winter Conference on Applications of Computer Vision (WACV); Mar. 2018; pp. 1377-1386.
Park, J. et al., "High-Quality Depth Map Upsampling and Completion for RGB-D Cameras", IEEE Transactions on Image Processing; vol. 23, Issue 12; Dec. 2014 ; pp. 5559-5572.
Pathak, D., et al., "Context Encoders: Feature Learning by Inpainting", In Proceedings of the IEEE Conference on Computer Vision and Pattern Recognition; Jun. 2016; pp. 2536-2544.
Pollefeys, M. et al., "A simple and efficient rectification method for general motion", Proceedings of the Seventh IEEE International Conference on Computer Vision, vol. 1; Sep. 1999; pp. 496-501.
Pradeep, V. et al., "MonoFusion: Real-time 3D Reconstruction of Small Scenes with a Single Web Camera", 2013 IEEE International Symposium on Mixed and Augmented Reality (ISMAR); Oct. 2013; pp. 83-88.
Reynolds, M. et al., "Capturing time-of-flight data with confidence", In CVPR 2011; Jun. 2011; pp. 945-952.
Richardt, C. et al., "Coherent Spatiotemporal Filtering, Upsampling and Rendering of RGBZ Videos", Computer Graphics Forum; vol. 31, No. 2pt1; May 2012; pp. 247-256.
Richardt, C. et al., "Real-time Spatiotemporal Stereo Matching Using the Dual-Cross-Bilateral Grid", European conference on Computer vision, Sep. 2010; pp. 510-523.
Scharstein, D. et al., "A taxonomy and evaluation of dense two-frame stereo correspondence algorithms", International Journal of Computer Vision, 47(1-3); Apr. 2002; pp. 7-42.
Scharstein, D. et al., "High-Resolution Stereo Datasets with Subpixel-Accurate Ground Truth", German Conference on Pattern Recognition; Sep. 2014; pp. 31-42.
International Search Report and Written Opinion dated Dec. 20, 2019 for International Application No. PCT/US2019/054696, 15 pages.
Barron, Jonathan T. et al., "The Fast Bilateral Solver", International Conference on Financial Cryptography and Date Security; Sep. 17, 2016; pp. 617-632.
Newcombe, Richard A., "KinectFusion: Real-Time Dense Surface Mapping and Tracking", 2011 IEEE 10th International Symposium on Mixed and Augmented Reality; Oct. 26, 2011; pp. 12-136.
Stuhmer, Jan et al., "Real-Time Dense Geometry from a Handheld Camera", Patter Recognition, Springer Berlin Heidelberg, ISBN: 978-3-642-15985-5; Sep. 22, 2010; pp. 11-20.
Zhang, Yinda et al., "Deep Depth Completion of a Single RGB-D Image", 2018 IEEE Conference on Computer Vision and Pattern Recognition; Jun. 18, 2018; pp. 175-185.
International Preliminary Report on Patentability dated Apr. 15, 2021 for International Application No. PCT/US2019/054696, 8 pages.

* cited by examiner

DEPTH FROM MOTION FOR AUGMENTED REALITY FOR HANDHELD USER DEVICES

CROSS-REFERENCE TO RELATED APPLICATIONS

The present application is a U.S. National Stage Application under 35 U.S.C. § 371 of International Patent Application Serial No. PCT/US2019/054696, entitled "DEPTH FROM MOTION FOR AUGMENTED REALITY FOR HANDHELD USER DEVICES," filed on Oct. 4, 2019, which claims priority to U.S. Provisional Application No. 62/741,256, entitled "DEPTH FROM MOTION FOR SMARTPHONE AR," filed on Oct. 4, 2018, the entireties of which are incorporated by reference herein.

BACKGROUND

Compute-enabled cellular phones ("smartphones"), tablet computers, and other handheld user devices increasingly are utilized for providing augmented reality (AR) experiences. Such devices are used as a viewfinder on an augmented world, where virtual content is rendered on top of the device's camera feed in real-time. These portable devices support such AR capability using some form of six degree of freedom (6DoF) tracking capability using just typical sensors found inside these device, such as a color camera and an inertial measurement unit (IMU), leading to many developments in visual inertial odometry (VIO) and simultaneous localization and mapping (SLAM). These developments led to the development and use of sparse 6DoF tracking platforms with AR applications that create the illusion that users can place and lock virtual objects in their environments. However, the illusion is degraded by the occurrence of visual inconsistencies appear, such as inaccurate occlusions between real and virtual objects.

To achieve a more realistic sense of immersion with more accurate handling of occlusions, placement of virtual content, and virtual-real world interactions (such as virtual object-to-physical object collisions), handheld device-based AR applications rely on dense depth maps generated at the device in real-time. However, it often is impracticable for many handheld devices to provide real-time dense depth maps given compute limitations or sensor limitations. Many currently-available handheld devices lack the stereoscopic cameras for depth sensing or the use of a time-of-flight (ToF) sensor or other dedicated depth sensor, and the cost and complexity of adding such additional sensor capability often is impracticable due to cost, power, and form-factor considerations. Moreover, while dense and edge-preserving depth map generation techniques that utilize a monocular camera have been developed, these conventional techniques typically require dedicated hardware or considerable compute resources that often are not available on many handheld devices, and thus are unable to be satisfactorily implemented in place of a dedicated depth sensor for real-time depth map generation on many widely-available handheld devices.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

The present disclosure describes systems and methods for providing a depth-from-motion pipeline for supplying dense and low-latency depth maps at a sufficient rate for handheld user devices, even when such devices lack a stereoscopic camera configuration (that is, have only a monocular camera) or which have limited compute resources (e.g., having only a single central processing unit (CPU) core available and lacking use of a graphics processing unit (GPU)). The described techniques are capable of operation across a variety of different device configurations with different camera sensors for which control over various parameters, such as exposure or focus, may not be available. These techniques can provide dense depth at relatively low latency and with relatively low compute requirements, even under conditions of relatively poor 6DoF tracking or in untextured environments As described in greater detail below, these systems and techniques rely on a depth-from-motion pipeline that includes some or all of the following aspects: efficient stereo matching on the basis of polar rectified images; an effective keyframe selection process; an efficient stereo matching algorithm leveraging, for example, the benefits of the Patch-Match Stereo algorithm and the HashMatch algorithm; a planar bilateral solver that improves conventional bilateral solvers for depth post-processing that leads to higher quality point clouds by encouraging planar solutions, employs an effective initialization scheme leading to faster convergence and lower compute, and employs an approach for producing temporally stable results; and a late stage rendering stage that provides a fluid low-latency experience.

Figure 1:
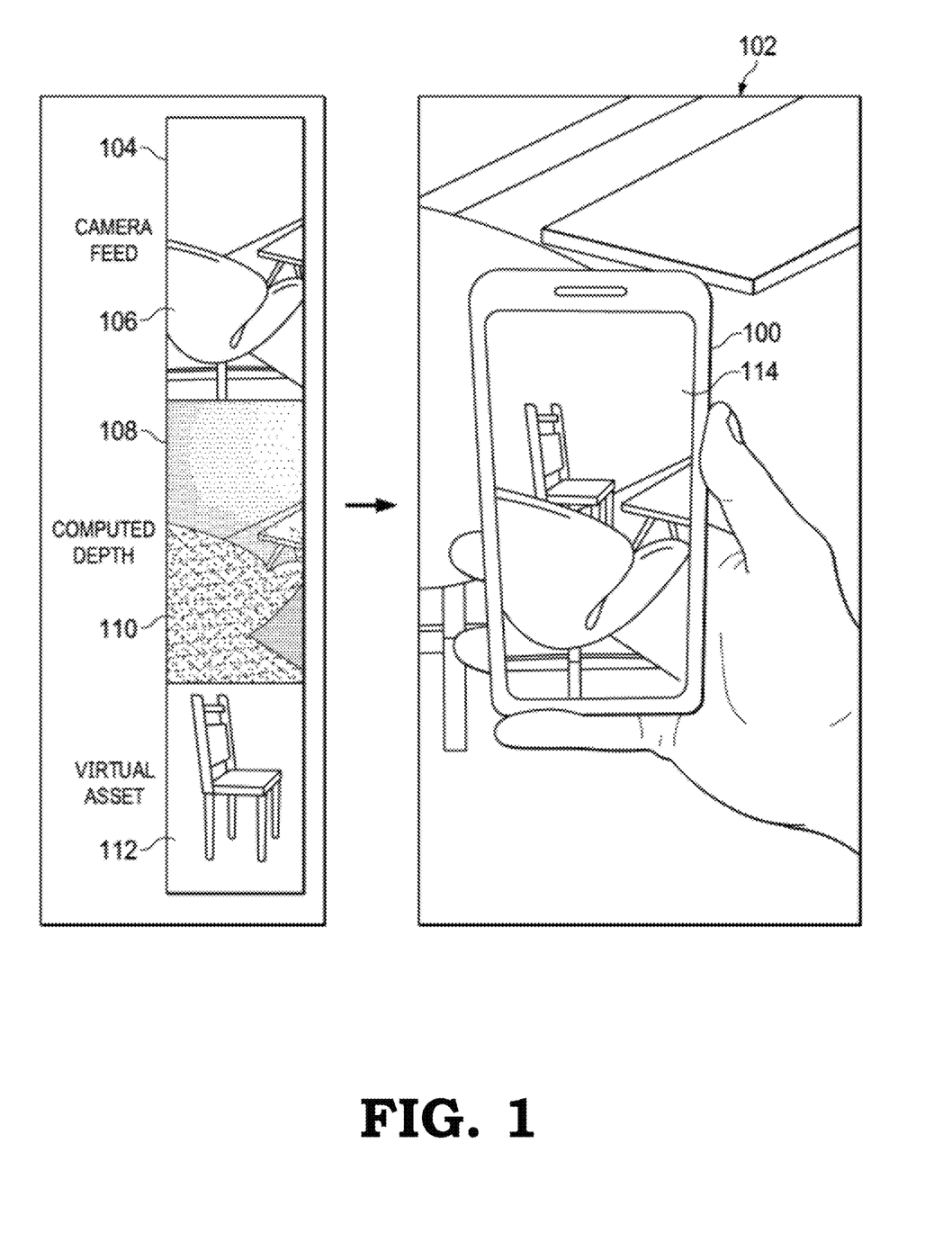
FIG. 1 is a diagram illustrating a process of providing an augmented reality (AR) experience with a handheld user device as a viewfinder into an AR scene based on real-time dense depth map generation process compatible with a monocular camera sensor configuration in accordance with some embodiments.

FIG. 1 illustrates an example provisioning of an AR experience on a handheld user device 100 deployed in a real-world scene 102 using a depth-from-motion pipeline as described herein. As illustrated, the handheld user device 100 (e.g., a smartphone, tablet computer, personal digital assistant, portable video game device) employs a monocular camera sensor (not shown in FIG. 1) to capture a camera feed 104 composed of a sequence of captured real-world images 106 of the real-world scene 102 (note that "image" and "frame" are used interchangeably herein). A software-implemented depth-from-motion pipeline at the handheld user device 100 uses position/pose tracking data from an IMU (not shown in FIG. 1) to determine the current position/pose (6DoF) of the handheld user device 100 relative to the real-world scene 102, and from this 6DoF data and at least some of the captured real-world images 106 of the color camera feed 104, compute depth information 108 for the real-world scene in real time in the form of a sequence of dense depth maps 110.

An AR software application executing on the handheld user device 100 supplies one or more virtual objects 112 to be incorporated into the captured real-world imagery, along with information specifying the intended orientation and placement of the one or more virtual objects 112 relative to the coordinate system of the real-world scene or relative to the current pose/position or current viewpoint of the handheld user device 100. These virtual objects 112 can include for example, stationary objects or objects in motion, directional arrows or other navigational aids, informational overlays, whimsical overlays, and the like.

The depth-from-motion pipeline then uses the depth information represented by the current depth map 110 to render the one or more virtual objects 112 into the current captured real-world image 106, including implementing accurate occlusion of one or more virtual objects 112 by real-world objects in the current captured real-world image 106, and vice versa, accurate interaction between the one or more virtual objects 112, and the like. The resulting AR viewfinder image 114 then is displayed at the handheld user device 100, with the AR viewfinder image 114 presenting the real-world scene 102 with the included AR content from the current viewpoint of the handheld user device 100. Thus, this process presents an AR experience to the user in which the display of the handheld user device 100 appears as a viewfinder into an AR scene that is based on the real-world scene 102.

Figure 2:
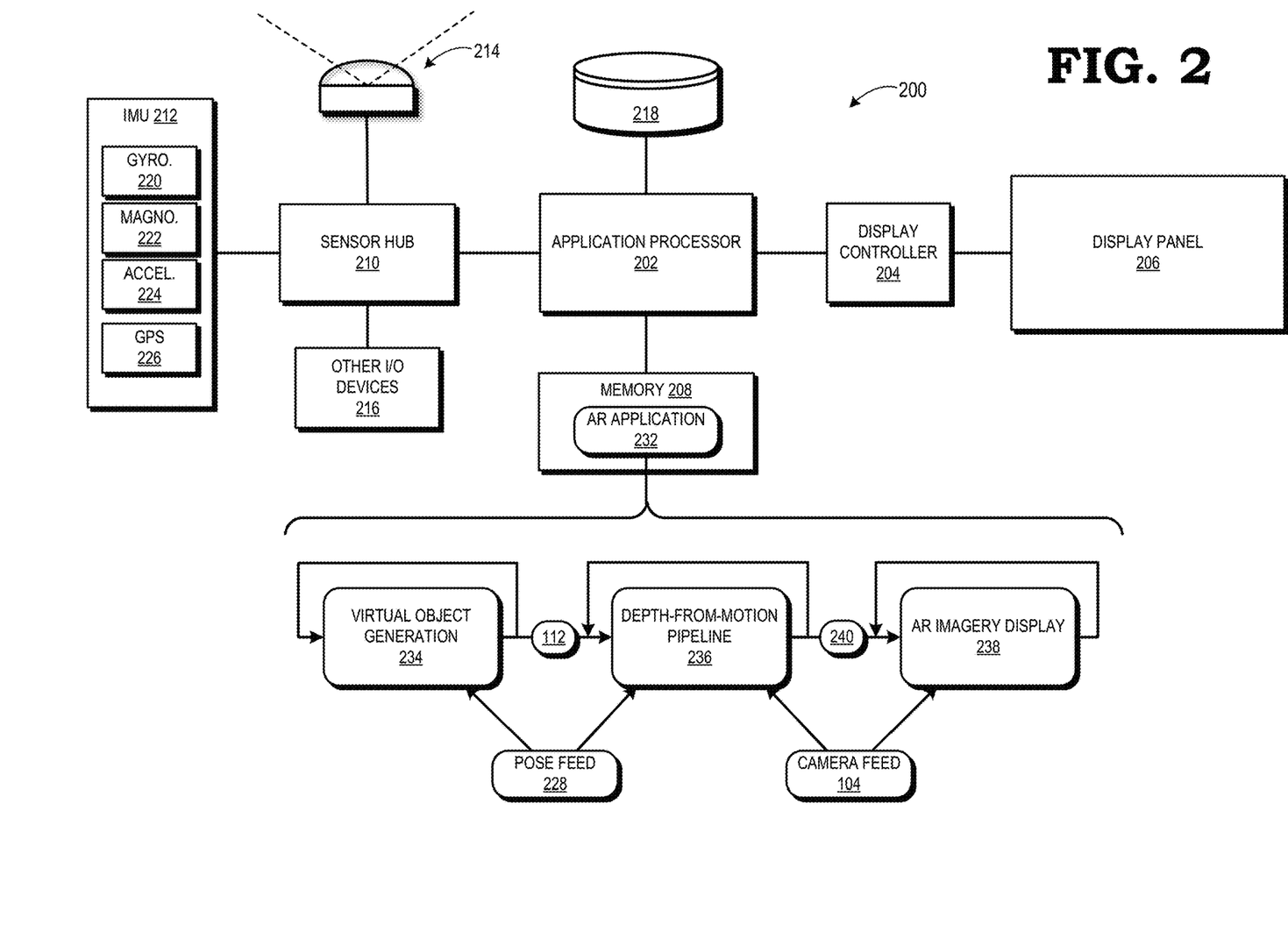
FIG. 2 is a diagram illustrating an example hardware configuration of the handheld user device of FIG. 1 in accordance with some embodiments.

FIG. 2 illustrates a hardware implementation 200 for the handheld user device 100 that is configured to support a depth-from-motion pipeline supporting an AR experience in accordance with some embodiments. As shown, the hardware implementation 200 includes an application processor 202 (e.g., a CPU), a display controller 204, a display panel 206, a system memory 208, a sensor hub 210, an inertial measurement unit (IMU) 212, a monocular color (e.g., red-green-blue, or RGB) camera 214, one or more other input/output devices 216, such as a keyboard, touchscreen, speaker, and the like, and a mass storage device 218. The IMU 212 includes one or more movement-based sensors, such as a gyroscope 220, a magnetometer 222, and an accelerometer 224, a global positioning system (GPS) sensor 226, and the like.

As a general operational overview, the monocular camera 214 operates to capture one or more sequences of real-world images 106 (FIG. 1) for inclusion in the camera feed 104, while the various sensors of the IMU 212 capture motion-related data representative of the pose, position, and movement of the handheld user device 100 for inclusion in a pose/position sensor feed 228. The sensor hub 210 operates to format, synchronize, and otherwise process the camera feed 104 and pose/position feed 228 and provide the resulting processed sensor streams for access by the application processor 202 (e.g., either through a direct input or via temporary storage in the memory 208, the mass storage device 218, or other storage component). The application processor 202, sensor hub 210, or other components operate to utilize the sensor data from the IMU 212, visual data from the monocular camera 214, and other available data to periodically determine a current pose and position (current pose/position 230) of the handheld user device 100 relative to the real-world scene 102 using any of a variety or combination of techniques, including SLAM, VIO, and the like. In at least one embodiment, the current pose/position 634 represents six degrees of freedom (6DoF) relative to a coordinate system of the real-world scene 102, while in other embodiments the current pose/position 634 represents three degrees of freedom (3DoF) relative to the coordinate system of the real-world scene 102.

The application processor 202 executes the executable instructions of one or more AR-supporting software applications 232 (herein referred to as the singular "AR application 232" for ease of reference) stored in the memory 208 or mass storage device 218 to provide an AR experience to the user through the display at the display panel 206 of captured real-world imagery of the real-world scene 102 that is augmented with the inclusion of embedded virtual objects and other virtual content so that the display panel 206 appears as a viewfinder into an AR-enhanced version of the real-world scene 102 in which the user is located. For ease of description, reference to the AR application 232 performing a particular operation below is understood to mean that corresponding instructions of the AR application 232, that when executed by the application processor 202, cause the application processor 202 and/or other components of the handheld user device 100 to perform the particular operation.

As illustrated, the AR application 232 implements at least three stages that cycle or execute in parallel, including a virtual object generation stage 234, a depth-from-motion pipeline 236, and an AR imagery display stage 238. At the virtual object generation stage 234, the AR application 232 generates or otherwise identifies the virtual objects 112 representing AR content to incorporate into the current captured images 106 of the camera feed 104. These virtual objects 112 can be determined on the basis of, for example, a game application that generates virtual content based on the user's interaction with the game application, may be determined on the basis of a navigational program (e.g., AR graphical navigational aids depicting the current direction the user should travel to reach an intended destination), graphical content to replace or augment a real-world object, and the like. In at least one embodiment, each virtual object 112 includes a graphical representation of a virtual asset or other object, such as a two-dimensional (2D) image, a three-dimensional (3D) model, or the like, as well as positioning data identifying the intended pose/position of the virtual object, which may be relative to the coordinate system of the real-world scene 102, relative to a viewpoint represented by the current pose/position 230 of the handheld user device 100, and the like.

The depth-from-motion pipeline 236 operates to use the captured real-world images 106 of the camera feed 104, the stream of current pose/positions 230 from the pose/position feed 228, and the virtual objects 112 supplied by the virtual object generation stage 234 to incorporate the AR content represented by the virtual objects 112 into the captured real-world images 106 to generate a stream of AR images 240 that represent a viewfinder representation of an AR-version of the real-world scene 102. As described in greater detail below, the depth-from-motion pipeline 236 uses a combination of techniques to efficiently determine a current depth map utilizing the limited compute resources of the application processor 202 and the monocular camera 214, rather than relying on a stereoscopic, ToF, or other costly, complex, or cumbersome dedicated depth sensor configuration.

The AR imagery display stage 238 controls the display of the stream of AR images 240 generated by the depth-from-motion pipeline 236 via the display controller 204 and the display panel 206 so as to present an AR viewfinder representation of an AR-enhanced version of the real-world scene 102 from the viewpoint of the current pose/position 230 of the handheld user device 100. This can include, for example, application of a homography transform or other warping process to compensate for any motion or change in pose/position since the current AR image 240 was generated, adjustment or refinement of various image parameters, including focus, contrast, brightness, and the like.

Figure 3:
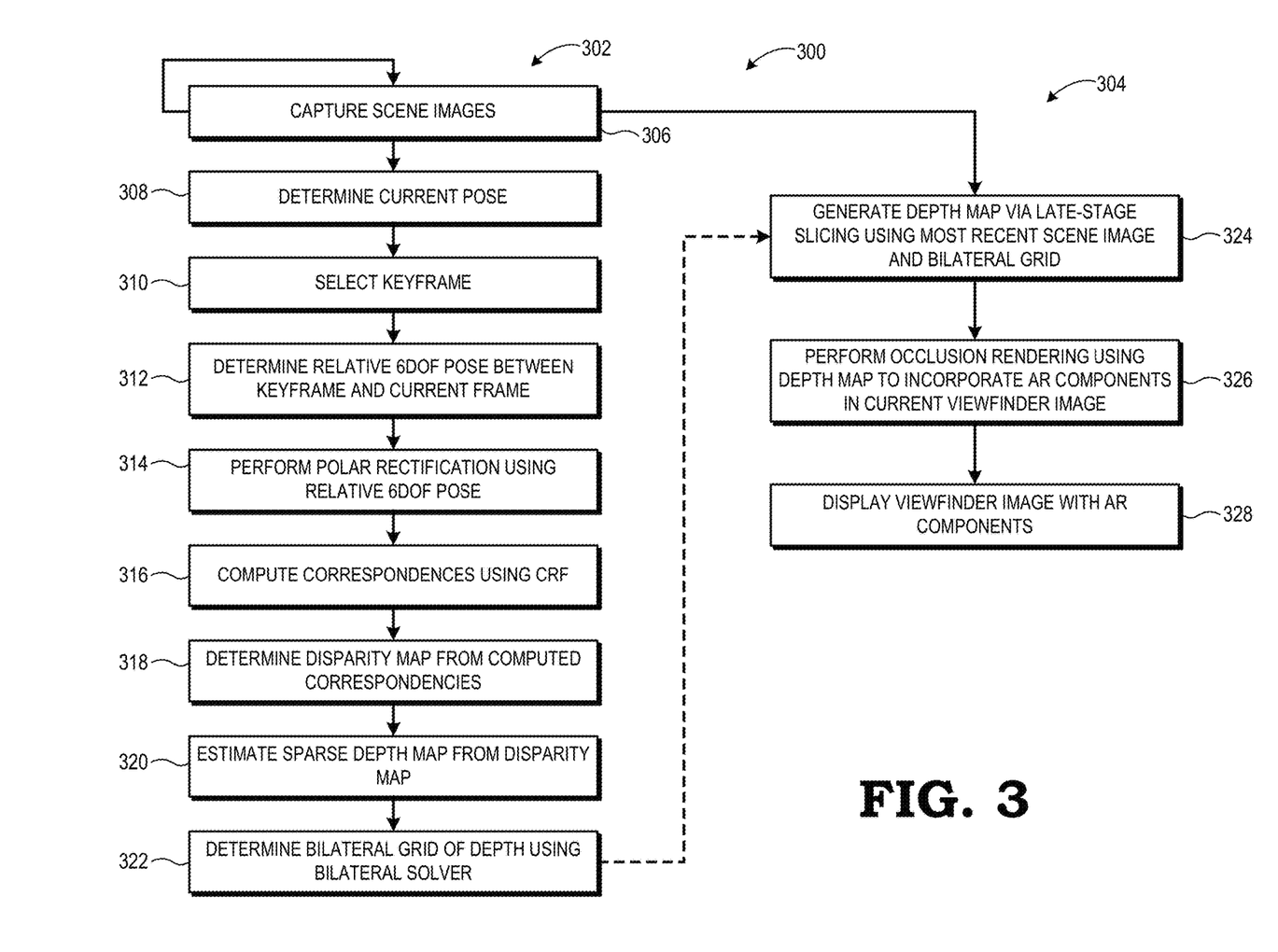
FIG. 3 is a flow diagram illustrating an example method for a depth-from-motion pipeline implemented by a handheld user device in accordance with some embodiments.
Figure 4:
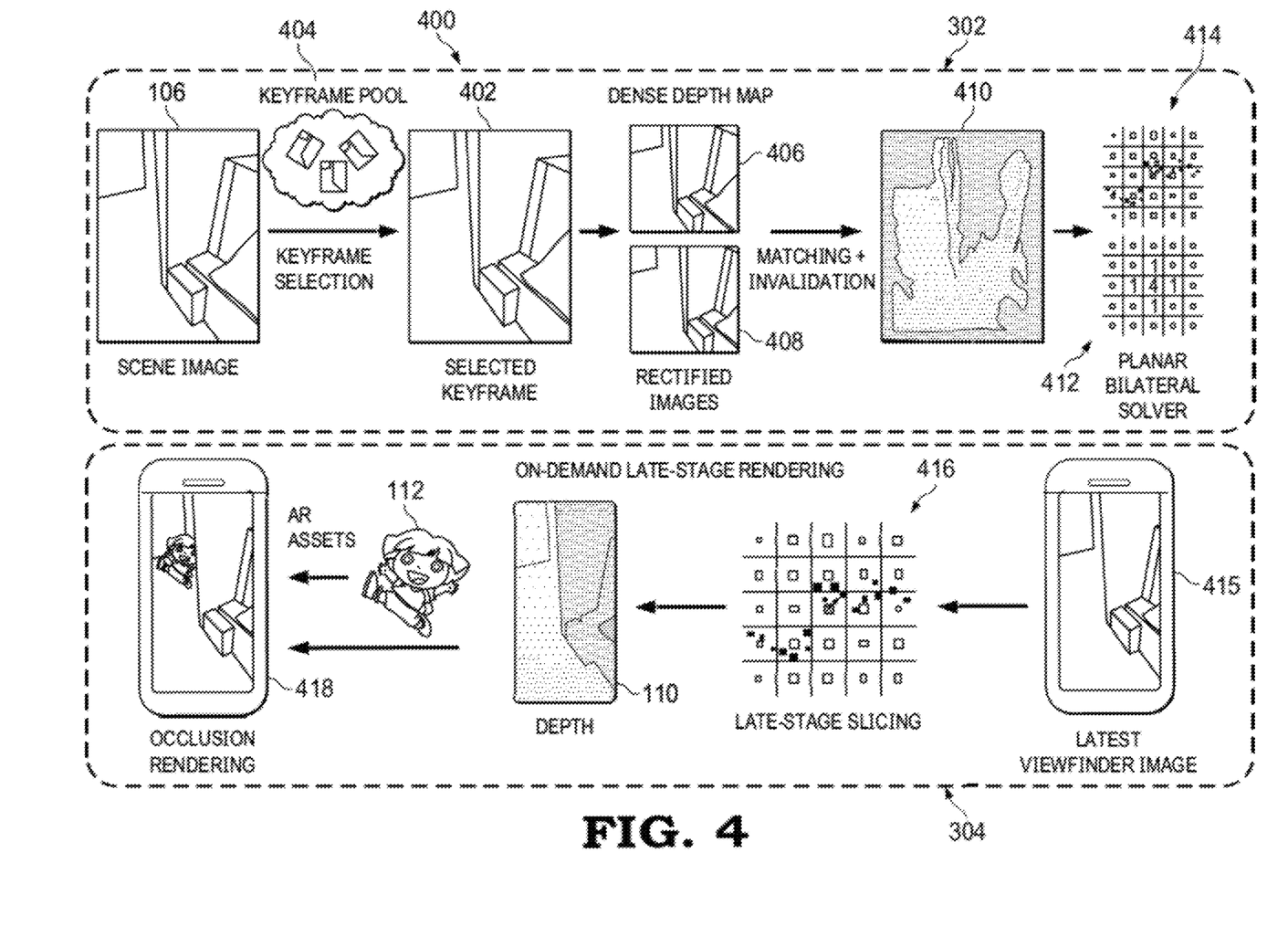
FIG. 4 is a diagram illustrating the depth-from-motion pipeline in accordance with some embodiments.

FIG. 3 illustrates a flowchart 300 illustrating an example summary method flow of the depth-from-motion pipeline 236 of FIG. 2 and FIG. 4 provides a graphical representation 400 of the processes of the depth-from-motion pipeline 236 relative to the flowchart 300. Various processes briefly described with reference to the flowchart 300 are then described separately below in greater detail.

The depth-from-motion pipeline 236 implements two decoupled paths: a grid-of-depth generation path 302 and an on-demand late stage rendering path 304. With the handheld user device 100 in the user's hand, the grid-of-depth generation path 302 starts at block 306 with the capture of real-world camera images 106 (referred to herein as "scene images 106") via the monocular camera 214 and at block 308 with the tracking of current pose/positions using, for example, the off-the-shelf VIO platform of ARCore available from Google LLC, or any of a variety of pose/position tracking techniques using an IMU and/or a monocular camera. Given the latest available scene image 106 (which could be a grayscale image for computational efficiency), the next step towards computing a depth map 110 (FIG. 1) is the selection, at block 310 of a keyframe 402 (FIG. 4) that is suitable to perform stereo matching from a keyframe pool 404 (FIG. 4) composed of a recent subset of the past scene images 106. Next, at block 312 the relative 6DoF pose between the keyframe 402 and the current scene image 106 is determined and at block 314 this relative 6DoF pose is used to perform polar rectification to generate a pair of rectified images 406, 408 (FIG. 4) from the keyframe 402 and the current scene image 106. While polar-rectification speeds up stereo matching by reducing the correspondence search to the same horizontal lines in both images 406, 408, in some embodiments the polar rectification process is omitted.

At block 316, a fast conditional random field (CRF) solver is used to compute correspondences between the pair of images 406, 408, and at block 318 wrong estimates are discarded via an efficient machine learning-based solution, leading to the generation of one or more disparity maps that are relatively free of outliers. At block 320, a sparse depth map 410 (FIG. 4) is estimated using the one or more disparity maps through triangulation. At block 322, the sparse depth map 410 is then fed into a planar bilateral solver 412 (FIG. 4), which is an enhanced fast bilateral solver that generates a bilateral grid of depths 414 (FIG. 4)(also referred to herein as "bilateral grid 414"), as opposed to a depth map.

As for the on-demand late stage rendering path 304, in response to receiving the most recent viewfinder image 415 (which represents a color recent scene image dimensioned and otherwise formatted for display at the display panel 206), at block 324 the bilateral grid 414 is converted on-demand to a dense, spatio-temporally consistent depth map 110 (FIG. 1) by employing a slicing process 416 on the bilateral grid 414 with the most recent viewfinder image 415 (as opposed to the scene image 106 used to populate the bilateral grid 414), which ensures that the edges of the produced depth map 110 are aligned with the RGB viewfinder image 415 about to be displayed at the display panel 206. In at least one embodiment, the generation of the bilateral grid 414 of path 302 and the slicing of block 324 of path 304 are decoupled and run on separate threads. Depth maps 110 can therefore be generated at a relatively high frame rate with relatively low latency, efficiently making it independent of the run-time of the CRF inference of blocks 312-320, allowing deployment of the techniques describe herein on a wide variety of handheld user devices with varying levels of compute resources without sacrificing quality or effective frame rate. At block 326, the AR application 232 leverages this real-time depth estimation represented by the generated depth map 110 to perform occlusion rendering with the one or more virtual objects 112 intended for inclusion in a current viewfinder image generated from the most recent scene image 106 to generate a current AR viewfinder image 240, which, at block 328, is provided for display at the display panel 206 as an AR viewfinder image 418.

Keyframe Selection

As described above, the approach for depth estimation in the depth-from-motion pipeline 236 is based on stereo matching between the most recent image and a past keyframe. In one embodiment, the choice of the keyframe is based on one or more disparate factors, each of which contributes to the potential matching quality of a candidate keyframe. For instance, greater depth accuracy is gained by increasing the stereo baseline between the chosen keyframe and the present position, but such frames are also further back in time, which can introduce temporal inconsistencies. Conventional approaches for motion stereo often rely on keyframes from a fixed time delay. Such approaches are robust when under constant movement, such as in a vehicle, but usage for handheld devices often results in sporadic uneven motion. Other approaches rely on feature or geometry tracking, rather than matching correspondences to a specific frame but these algorithms often result in sparse depth or are unable to run at adequate framerates.

In one embodiment, the keyframe selection process of the depth-from-motion pipeline 236 includes defining a soft-cost function to select an optimal keyframe for the latest target image using one or more metrics. A fixed-capacity pool of potential keyframes is maintained, with each newly captured image being added to this pool if the 6-DoF visual-inertial tracking is successful, replacing outdated images. In one embodiment, the cost metrics used to select the best keyframe from the pool are:

$b_{i,j}$: The baseline distance in 3D between two frames i and j (which generally should be large)

$t_{i,j}$: The time distance when frames i and j are capture (generally should be minimized)

$a_{i,j}$: The fractional overlap, in the range [0,1], of the image areas for the frames i and j, computed based on their viewing frustums (generally should be maximized)

$e_{i,j}$: The measured error of pose-tracking statistics for the two frames i and j (generally should be small)

A multidimensional cost function is used to select a keyframe k to pair with the latest reference image r, producing the minimum total cost from the keyframe pool K:

$$\frac{\omega_b}{b_{r,k}} + \omega_t t_{r,k}^2 + \omega_a(1 - a_{r,k}) + \omega_e e_{r,k}$$

Where the choice of the weighting $\omega_b$ for the baseline is relative to the nominal desired baseline for the target scene depth. Choosing candidate frames based on a known baseline is a common technique for motion stereo, but for handheld devices this metric also can be weighted against other considerations. The temporal difference $t_{r,k}$ is weighted by scalar $\omega_t$ to choose frames close together. The further frames are apart temporally, the more difficult matching is for scenes with animation or dynamic content. The cost term for area overlap $a_{r,k}$ typically is weighted heavily with $\omega_a$, since although successful matching can occur between frames with only a partial overlap, greater overlap reduces the need of depth values to be extrapolated to other parts of the target image. If 6-DoF motion tracking process produces a frame that is measured to have poor confidence, then in one embodiment the frame is never added to the keyframe pool at all. However, even candidate keyframes with high confidence may have some relative error to the latest reference frame. This relative error cost is weighted against the other costs with $\omega_e$. With a keyframe so identified, stereo rectification is performed next, as described above.

Stereo Rectification

Given two cameras and their respective poses, the fundamental matrix that governs how pixels corresponding to the same 3D point are related can be calculated. For two corresponding pixels x and x' that come from the projection of a 3D point X, and the fundamental matrix F, one can observe that x' lies on the line l'=Fx. The correspondence search is then constrained to a one-dimensional problem. Once correspondences are estimated, for instance using the matching algorithm described below, the depth of any given pixel can be estimated through triangulation.

Due to the linear cache pre-fetch behavior of modern CPUs, it is more efficient to perform this one-dimensional (1D) search along horizontal lines in images that are stereo-rectified. Such images have the property that all epipolar lines are parallel to the horizontal axis of the image. Standard dual-camera setups with a fixed baseline have the advantage that at each frame, the captured images are already close to be stereo-rectified. Mostly due to mechanical imprecision, these images still need to be stereo-rectified in software. For these setups, planar rectification typically is used due to the availability of production-level public implementations.

However, when dealing with a single camera that is freely moving, as with the handheld user device 100 employing the monocular camera 214, epipoles can be anywhere on the image plane. In particular, when the user is moving forward with their camera, the epipole is inside the image, which typically causes convention techniques such as planar rectification to fail. In contrast, the polar rectification technique described below allows the users to freely move with the handheld user device 100.

Some conventional rectification algorithms, when given a pair of images and their relative pose, transform these images such that their epipolar lines are parallel and corresponding epipolar lines have the same vertical coordinate. For computational reasons described earlier, it is generally desired that for a point (x,y) in the left-rectified image, the correspondence lies at (x',y) in the right-rectified image with x'<x and $\tau_{min} < x-x' < \tau_{max}$, with $\tau_{min}$ being a small constant, usually 0 or 1, and $\tau_{max}$ being the maximum disparity, such as, for example, 40. Such conventional algorithms do not provide for the obtaining of rectified images for which corresponding pixels lie in a fixed disparity range. Conversely, described herein is an approach constrains solutions to a known disparity interval which can be efficiently exploited while estimating correspondences.

Some camera configurations can lead to rectified images that, modulo disparity, are flipped version of each other. These configurations break the requirement of x'<x. These cases are detected when the dot products between the ray through the optical centers and their respective image center in world coordinates, and the vector that links both optical centers, have opposite signs. In that case, one of the images typically should be flipped.

As mentioned earlier, efficient stereo matching assumes that all correspondences reside in a pre-defined range of disparity values $[\tau_{min}, \tau_{max}]$, with $\tau_{min} > 0$. This assumption can be violated with negative disparities, or disparities that exceed the maximum disparity assumed by the stereo-matching algorithm. Accordingly, in at least one embodiment, a shift is applied to bring disparities into a valid range. First, given the relative transform between the two frames and a pre-defined range of depth values $[D_{min}, D_{max}]$ the process is expected to handle, $[\tau_{min}^L, \tau max^L]$ and $[\tau_{min}^R, \tau_{max}^R]$ are estimated. These intervals correspond to the disparity ranges required to make predictions if the left or right image is used as reference, respectively. The reference image is selected, as is the amount of horizontal shift required to fit in the expected disparity range $[\tau_{min}, \tau_{max}]$ based on which configuration requires the smallest shift and on the sign of the estimated disparities. In the event that the expected range of disparities is too small to accommodate the current pair, in one embodiment the rectified images are resized accordingly.

When operating on textured scenes, well-known standard techniques like PatchMatch Stereo or HashMatch have a very similar sub-pixel accuracy around 0.2 pixels. Thus, to maximize depth-precision, in one embodiment the rectified images are resized to make fuller use of $[\tau_{min}, \tau_{max}]$ while keeping the total number of pixels constant.

Most imprecision in the relative transform between the two images lead to gross rectification problems. In practice, systems like ARCore only suffer from minor pose imprecision. When the epipoles are "far" from the images, compensation for some small pose imprecision is achieved by setting $\tau_{min}$ between, for example, [5, 10] as opposed to 0 or 1. When the epipole(s) are located within the image, a disk of pixels (e.g., of a radius of 20 pixels) located around the epipole can be preemptively invalidated. At this stage, regardless of the trajectory that the handheld user device 100 has followed, a rectified pair of images results. The next section addresses performing stereo-matching on these rectified images.

Stereo-Matching

Assuming the likelihood of solutions are well captured by a conditional probability from the exponential family:

$$P(D) = \frac{1}{Z(D)} e^{-E(D)}$$

a factorization of the following form often is favored:

$$E(D) = \sum_i \psi_u(y_i = l_i) + \sum_i \sum_{j \in N_i} \psi_p(y_i = l_i, y_j = l_j)$$

which constitutes a pairwise-CRF. Here $Y := \{y_1 \ldots y_n\}$ is the set of latent variables associated to pixels $\{x_1 \ldots x_n\}$. Each $y_i \in Y$ can take values in L, which is a subset of real numbers and corresponding to disparities. $N_i$ is the set of pixels adjacent to pixel i. Although NP-hard to solve in general, this decomposition has been widely used for numerous computer vision tasks. The term $\psi_u$ is usually referred to as the unary potential, and in the context of depth estimation via stereo matching, measures the likelihood that two pixels are in correspondence. The function $\psi_p$ is commonly referred to as the pairwise potential and acts as a regularizer that encourages piece-wise smooth solutions. The components that make the minimization costly are evaluating $\psi_u$ and the number of steps that the chosen optimizer takes to converge to good solutions. For the following, a unary potential having low-computational requirements with a truncated linear pairwise potential as pairwise potential is used. The cost function is optimized this cost function using a hybrid of PatchMatch and HashMatch [that is particularly efficient on CPU architectures, and which is described below.

The underlying approach of CRF inference using Patch-Match is to propagate good labels to neighboring pixels, exploiting local smoothness of the label space. Different propagation/update strategies have been explored in the literature, some of them designed for GPU architectures. The following describes a propagation strategy that is tailored for modern CPU instruction sets that rely on Single Instruction Multiple Data (SIMD) instructions to achieve intra-register parallelism and improved throughput. Achieving high performance on such architectures, e.g., ARM NEON for mobile devices, often requires efficient utilization of these vector registers. In particular, loading data from memory benefits from use of coherent loads—that is, for a vector register with n lanes of width b bits, SIMD instruction set architectures (ISAs) typically offer an instruction that loads n*b sequential bits, filling all lanes with one instruction. The counterpart is a diverged load, where each lane of the vector register is inserted into the vector register one at a time. Such diverged loads are required when the memory to be loaded is not sequential. This behavior poses a challenge to stereo algorithms, which typically sample diverged offsets per pixel when exploring the solution space. To complicate matters, this data parallelism is inherently directional.

For typical image layouts in memory, a vector register of pixels represents a subset of a particular image row, which prevents typical inference schemes (e.g. PatchMatch) from mapping well to SIMD architectures. The propagation of information horizontally in the image prevents efficient utilization of vector registers. Compared to PatchMatch, HashMatch typically requires more iterations for information to propagate further in the image, but each iteration is substantially cheaper and can be performed independently. PatchMatch, by contrast, is sequential in nature. Leveraging the strengths of each approach, in one embodiment the depth-from-motion pipeline 236 employs a hybrid variant that is well-suited for SIMD architectures. Instead of performing multiple independent propagation passes for each of the eight directions, k passes are performed in sequence, each designed to utilize the data-parallelism of the underlying vector architecture. For typical scenes, k ranging from 2 to 4 is sufficient. During even-numbered passes, each pixel considers hypotheses from the three neighbors above it (that is, the pixel at (x,y) considers hypotheses from (x−1,y−1), (x,y−1), (x+1,y−1)) in addition to the currently stored hypothesis. During odd-numbered passes, each pixel considered hypotheses from the three neighbors below it in addition to the currently stored hypothesis. Rows are processed sequentially, starting at the top of the image in even numbered passes and the bottom of the image in odd-numbered passes. Consequently, all pixels for a given row are independent of all other pixels in the same row. As is standard for such approaches, each hypothesis is evaluated by summing the stereo matching unary cost and a weighted smoothness term, the aforementioned truncated linear pairwise potential. The unary cost evaluation cannot be fully parallelized due to the distinct disparity value in each lane of the vector register. However, we can fully parallelize the rest of the data movement: the load of initial disparity values, the load of neighboring disparity values, and the smoothness cost computation.

The approximate maximum a posteriori probability (MAP) inference performed over the pairwise conditional random field yields one disparity value estimated for each pixel in the image. Unfortunately, when the scene lacks texture (e.g., a white wall) or contains repetitive patterns, the MAP solution of the corresponding pixels can be wrong. The typical solution is to invalidate such pixels since the distribution of their errors depends on image content, and hence estimating the maximum likelihood estimation (MLE) of these distributions is non-trivial (e.g., to be used in Kinect-Fusion-like filtering). Invalidation often is performed using thresholding on the unary cost of the solution, using a left-right consistency check, using connected component analysis, or a combination thereof. Performing a left-right consistency check leads to good invalidation results, but involves computing a disparity map for each image, which adds a significant computational cost to the pipeline 236.

However, by breaking the entire CRF process in cliques containing each pixel and their immediate neighbors, one can compute the negative log-likelihood $\mathcal{L}_i$ using:

$$\mathcal{L}_i = \psi_u(l_i) + \sum_{j \in N_i} \psi_p(l_i, l_j)$$

This formulation leads to better invalidation results than only considering the unary potential. As will be understood, pruning unlikely solutions removes a large portion of undesirable pixels. Unfortunately, in the case of untextured regions, the likelihood of solutions can be high yet incorrect. Thus, small connected components are invalidated in in disparity space. The resulting depth map 110 is free from the majority of unstable predictions. Depending on the compute architecture, performing this last invalidation step can become as compute intensive as solving the factorization CRF equation above. Thus, the connected component invalidation step can be approximated using a single decision tree to minimize the computational resources required. A decision tree is composed of split nodes and leaves. Each split node n stores a "weak learner" that is parameterized by function parameters $\theta_n$ and a scalar threshold $\tau_n$. To perform inference over the tree for pixel p, one starts at the root of the tree and evaluates:

$$s(p,n) = \mathbb{1}[f(p,\theta_n) > \tau_n]$$

If s(p,n) evaluates to 0, the inference continues over the left children of node n, and over the right children otherwise. This process repeats until reaching a leaf, which contains a binary probability distribution over the prediction space, invalidation in this case.

Consistent with convention, choosing f to be a dot product between the values of two pixel indices located around p, the values of $\theta_n$ and $\tau_n$ are greedily optimized to maximize the information gain (IG):

$$IG(\theta_n, \tau_n) = E(S) - \sum_{c \in L,R} \frac{|S_c|}{|S|} E(S_d)$$

with E representing the Shannon entropy and $\mathcal{L}$, $\mathcal{R}$ representing the left and right children of the node n.

With an outlier-free disparity map so generated, depth can finally be inferred. When using planar rectification, given a disparity d, a baseline b, and a focal length f, the depth Z can be trivially computed as $$Z = \frac{bf}{d}.$$

However, this closed form solution cannot be used in the case of polar rectification. A well-known solution that can be employed by the depth-from-motion pipeline 236 to deal with these cases is the optimal triangulation method, which requires minimizing a polynomial of degree 6, which could be inefficient on mobile architectures. Therefore, in one embodiment, the depth-from-motion pipeline 236 instead resorts to solving a simpler linear problem as known in the art, which is not optimal but fast to solve.

Bilateral Solver

The previous description provides how to obtain a depth map with relatively few false positives. However, these depth maps can be sparse (containing information only in textured regions), temporally inconsistent, and may not be aligned with the edges in the image. Accordingly, the following describes an effective improvement upon the conventional bilateral solver to efficiently generate dense, temporally stable, and edge aligned depth maps with low latency.

The bilateral solver is defined as an optimization problem with respect to a "reference" image r (in the present case, a grayscale image from the monocular camera 214, FIG. 2), a "target" image t of noisy observed values (in the present case, a noisy depth map as computed in per the description above), and a "confidence" image c (in the present case, the inverse of the invalidation mask as described above). The solver recovers an "output" image x that is close to the target where the confidence is large while being maximally smooth with respect to the edges in the reference image, by solving the following optimization problem:

$$\underset{x}{\text{minimize}} \frac{\lambda}{2} \sum_{i,j} \hat{W}_{i,j}(x_i - x_j)^2 + \sum_i c_i(x_i - t_i)^2$$

The first term encourages that all pairs of pixels (i, j) to be smooth according to the bilateral affinity matrix $\hat{W}_{i,j}$ and the smoothness parameter λ (set to 4, for example), while the second term encourages each $x_i$ to be close to each $t_i$ when $c_i$ is large. The matrix $\hat{W}$ is a bistochastic version of a bilateral affinity matrix W, where each $W_{i,j}$ is defined as:

$$W_{i,j} = \exp\left(-\frac{(p_i^x - p_j^x)^2 + (p_i^y - p_j^y)^2}{2\sigma_{xy}^2} - \frac{(r_i - r_j)^2}{2\sigma_r^2}\right)$$

where for each pixel i, $(p_i^x, p_i^y)$ is its (x,y) location and $r_i$ is its grayscale intensity in for reference image r. These spatial and intensity dimensions are modulated by bandwidth parameters $\sigma_{xy}$ and $\sigma_r$, which are set to, for example, 16.

As is known, the large and dense bistochastic bilateral affinity matrix can be represented with a compact factorization using a bilateral grid:

$$\hat{W} = S^T \text{diag}\left(\frac{n}{m}\right) B \text{diag}\left(\frac{n}{m}\right) S$$

where the splat S and slice $S^T$ matrices splat and slice into a bilateral grid, respectively, B is a [1,2,1] blur along the three dimensions of a bilateral grid, and vectors m and n induce a normalization that results in $\hat{W}$ being approximately bistochastic. With this factorization a variable substitution can be performed from pixel-space into "bilateral space":

$$x = S^T y$$

where y contains values for each bilateral grid vertex and x contains values for each pixel. Assuming the σ* parameters are not small, y will be substantially smaller than x. Thus, the computationally expensive pixel space optimization problem described above can be converted into a tractable bilateral space optimization problem:

$$\underset{y}{\text{minimize}} \frac{1}{2} y^T A y - b^T y + c$$

$$A = \lambda(\text{diag}(m) - \text{diag}(n)B\text{diag}(n)) + \text{diag}(S_c)$$

$$b = S(c \circ t) \text{ and } c = \frac{1}{2}(c \circ t)^T t$$

Where y is the solution to the problem in bilateral space and ∘ denotes a Hadamard product. Solving this problem thus simply requires solving a sparse linear system and undoing the variable substitution:

$$\hat{x} = S^T(A^{-1}b)$$

Using a conventional approach, this sparse linear system is solved using preconditioned heavy ball optimization, which produces similar results to a preconditioned conjugate gradient often used while being better suited to a fast implementation.

The bilateral solver as previously described is capable of producing edge-aware smooth depth maps from noisy or incomplete inputs and can be made to produce real-time results running on a mobile CPU. However, in at least one embodiment, the depth-from-motion pipeline 236 utilizes an improved, enhanced bilateral solver, referred to herein as a "planar bilateral solver" and described as follows. First, the solver (or indeed any linear smoothing operator) is generalized to produce output that is smooth in a coplanar sense, rather than smooth in a fronto-parallel sense. This formulation results in significantly improved output on scenes containing foreshortened planes (walls, floors, etc.), which are common in photographic and AR contexts. Second, a relatively simple and computationally inexpensive method for inducing real-time temporal consistency in the solver is employed, as well as an approach for "warm starting" multiple instances of a solver that improves convergence rates in a real-time/video-processing context. Third, the solver is utilized for "late stage" slicing, in which the bilateral grid of depths computed from earlier stereo inputs is used to produce edge-aware depth maps from the most recent viewfinder frame. The result is a low-latency output that is still edge-aware.

Planar Bilateral Solver

A bilateral solver solves for a per-pixel labeling that, along with a data term, minimizes the squared distances between pixels that are spatially nearby and have similar color or grayscale intensities. The lowest cost output of the solver (ignoring the data term) is therefore an image containing a single constant value, which in a stereo context means that the solver is strongly biased towards producing fronto-parallel output depth maps. This bias is problematic, as real-world environments frequently contain surfaces that are smooth or flat but not fronto-parallel, such as floors, walls, and ceilings. To illustrate, a conventional bilateral solver's output may be dramatically incorrect in the presence of flat but not fronto-parallel surfaces, causing foreshortened surfaces to be erroneously recovered as "billboard"-like flat surfaces oriented perpendicularly to the camera.

This fronto-parallel bias in stereo or depth-recovery pipelines has been addressed in other systems using specialized optimization algorithms designed to recover depth maps that minimize second-order variation, rather than first-order variation. These approaches can work, but often are too computationally expensive for real-time use and do not appear to be amenable to fast bilateral-space optimization. Accordingly, in at least one embodiment, the depth-from-motion pipeline 236 implements a bilateral solver process that embeds the bilateral solver in a per-pixel plane-fitting algorithm, such that the minimal-first-order-variation assumption of the bilateral solver causes the final output of the resulting algorithm to have low second-order variation. Local plane-fitting is well known in the art, usually under the assumption that the spatial support of each plane fit is very limited. By using the bilateral solver as the engine for aggregating plane-fit information, the resulting plane-fits are global and edge-aware. Using this global plane-fitting causes the pipeline's recovered depth map to not be confounded by foreshortened surfaces, as it is capable explaining away such surfaces as simply being slanted planes.

This approach, which as noted above is referred to as a "planar bilateral solver", fits a plane to each pixel in the image in a moving least squares context, where the interpolator in each pixel's least-squares fit is the output of a bilateral solver. Implicitly constructed is a 3D linear system at every pixel, in which the left and right hand sides of each linear system use the bilateral solver to compute the "scatter" matrix used in standard plane fitting. This approach is not dependent on any property of the bilateral solver except that the planar bilateral solver is an example of a linear filter with non-negative filter weights everywhere, and so this plane-fitting procedure is described herein in completely general terms.

Because the math for plane-fitting is tedious and well-understood, for the sake of brevity, the "planar filtering" approach is described primarily using pseudo-code, in Algorithm 1 below. This planar_filter(•) operator takes as input some image Z to be filtered (that is, the sparse depth map generated in the depth-from-motion pipeline 236), some non-negative filtering operator filter(•) (in this case, a bilateral solver), and some regularization parameter E. This algorithm filters the outer product of (x, y, Z, 1) with itself, which provides the left- and right-hand sides of a linear system at each pixel that is represented, in one embodiment, as a 6-channel image A and 3-channel image b (x and y are the coordinates of each pixel, 1 is an image of all 1's, ○ is the Hadamard product, and "/" is element-wise division. With these images the linear system can be solved at each pixel in parallel, using an LDL decomposition, which has been discovered to be more stable than various other options. Pseudo-code for this per-pixel solve is found in Algorithm 2. In the following pseudo-code, $Z_z$ is recovered, which is the constant offset of each pixel's plane fit, which is then used as the output depth as each pixel. Note that the illustrated algorithm further computes $(Z_x, Z_y)$, an estimated surface normal at each pixel, which is not utilized in the techniques described herein.

The parameter $\epsilon$ biases the output of planar filtering to be fronto-parallel, by imposing Tikhonov regularization on the surface normals of the recovered surface. As $\epsilon$ approaches infinity, the output of planar_filter(•) approaches the output of filter(•). As a result, the standard bilateral solver can be viewed as an instance of the planar bilateral solver that has been heavily regularized to produce maximally fronto-parallel output—thereby further demonstrating the standard bilateral solvers bias towards fronto-parallel output.

Because applying a planar filter involves invoking the underlying filter(•) nine (3×3) times, and because invoking this filter is significantly more computationally expensive than performing element-wise per-pixel math, applying the planar bilateral solver could be roughly nine times more computationally expensive than applying a standard bilateral solver. This can be reduced somewhat by noting that filter(1)=1 in the present case and so needn't be computed, and by computing the other 8 bilateral solver instances in parallel which allows for easy vectorization. The following passages demonstrate that, in practice, the planar solver benefits substantially from temporal warm-start initialization, thereby giving it runtimes that are not much more than those of the regular bilateral solver.

---

Algorithm 1: planar_filter(Z, filter(·), $\epsilon$) - Input: an image Z to be filtered, some linear averaging filter(·), and some non-negative regularization parameter $\epsilon$, Output: a three channel image of per-pixel plane fits ($Z_x$, $Z_y$, $Z_z$).

1: $F_1 \leftarrow$ filter(1)
2: $F_x \leftarrow$ filter(x)
3: $F_y \leftarrow$ filter(y)
4: $F_z \leftarrow$ filter(Z)
5: $F_{xx} \leftarrow$ filter(x ○ x)
6: $F_{xy} \leftarrow$ filter(x ○ y)
7: $F_{xz} \leftarrow$ filter(x ○ Z)
8: $F_{yy} \leftarrow$ filter(y ○ y)
9: $F_{yz} \leftarrow$ filter(y ○ Z)
10: $A_{1,1} \leftarrow F_1 ○ y ○ y - 2(y ○ F_y) + F_{yy} + \epsilon^2$
11: $A_{1,2} \leftarrow F_1 ○ y ○ x - x ○ F_y - y ○ F_x + F_{xy}$
12: $A_{2,2} \leftarrow F_1 ○ x ○ x - 2(x ○ F_x) + F_{xx} + \epsilon^2$
13: $A_{1,3} \leftarrow F_1 ○ y - F_y$
14: $A_{2,3} \leftarrow F_1 ○ x - F_x$
15: $A_{3,3} \leftarrow F_1 + \epsilon^2$
16: $b_1 \leftarrow F_z ○ y - F_{yz}$
17: $b_2 \leftarrow F_z ○ x - F_{xz}$
18: $b_3 \leftarrow F_z$
19: $(Z_x, Z_y, Z_z) \leftarrow$ solve_image_ldl3(A,b) [see Algorithm 2 for solve_image_ldl3(A,b)]

---

Algorithm 2: solve_image_ldl3(A,b) - Input: a 6-channel image A and a 3-channel image b, where the channels in A correspond to the upper triangular part of a 3×3 matrix; Output: a three-channel x where for each pixel i in the input linear system, x(i) = A(i)/b(i), where the linear solve is performed using an LDL compression.

1: $d_1 = A_{1,1}$
2: $L_{1,2} = A_{1,2}/d_1$
3: $d_2 = A_{2,2} - L_{1,2} ○ A_{1,2}$
4: $L_{1,3} = A_{1,3}/d$
5: $L_{2,3} = (A_{2,3} - L_{1,3} ○ A_{1,2})/d_2$
6: $d_3 = A_{3,3} - L_{1,3} ○ A_{1,3} - L_{2,3} ○ L_{2,3} ○ d_2$

-continued

Algorithm 2: solve_image_ldl3(A,b) - Input: a 6-channel image A and a 3-channel image b, where the channels in A correspond to the upper triangular part of a 3×3 matrix; Output: a three-channel x where for each pixel i in the input linear system, x(i) = A(i)/b(i), where the linear solve is performed using an LDL compression.

Figure 5:
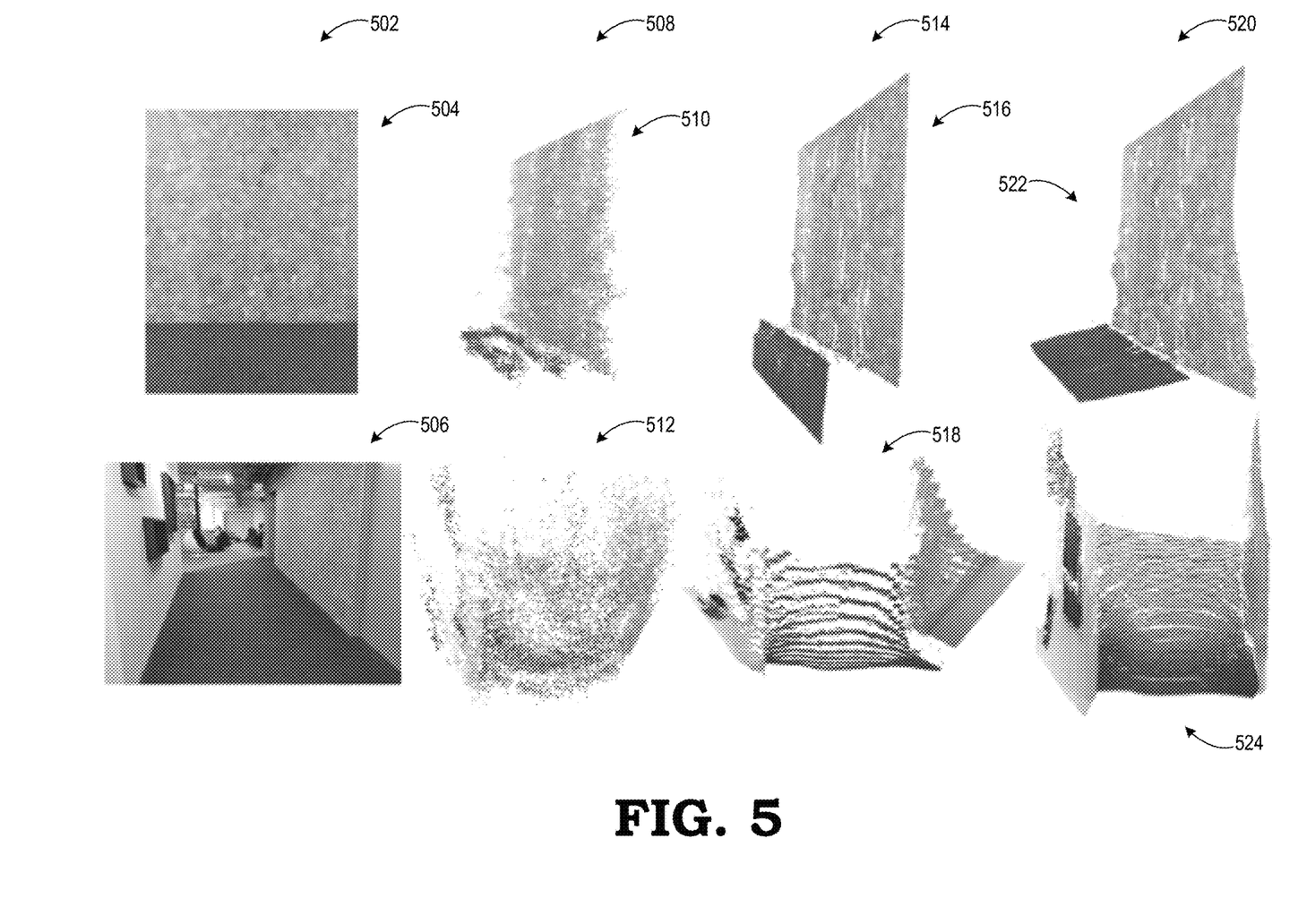
FIG. 5 is a diagram illustrating a comparison of results from a conventional bilateral solver with results from a planar bilateral solver in accordance with some embodiments.

7: $y_1 = b_1$
8: $y_2 = b_2 - L_{1,2} \circ y_1$
9: $y_3 = b_3 - L_{1,3} \circ y_1 - L_{2,3} \circ y_2$
10: $x_3 = y_3/d_3$
11: $x_2 = y_2/d_2 - L_{2,3} \circ x_3$
12: $x_1 = y_1/d_1 - L_{1,2} \circ x_2 - L_{1,3} \circ x_3$ FIG. 5 illustrates an example comparison of the planar bilateral solver employed by the depth-from-motion pipeline 236 and a conventional planar bilateral solver. The leftmost column 502 includes two input images 504, 506 (scene images 106) captured by the monocular camera 214 in an indoor environment, with the image 504 primarily capturing a portion of a wall in the indoor environment and the image 506 primarily capturing a perspective view of a corridor including the portion of the wall represented in image 504. In the next column 508, raw point clouds 510 and 512 are generated from the stereo-matching process described above from images 504 and 506, respectively. Note that these raw point clouds 510, 512 are visualized from different angles than that of the camera used to capture the images 504, 506 for ease of illustration. Column 514 includes an example output 516 of application of the conventional bilateral solver for the image 504 using the raw point cloud 510 and an example output 518 of application of the conventional bilateral solver for the image 506 using the raw point cloud 512. As shown in output 516, the conventional bilateral solver produces reasonable results when surfaces happen to be fronto-parallel (e.g., as in the portion of the wall represented in image 504), but exhibits significant artifacts when this fronto-parallel bias is incorrect, as shown in output 518. The last column 520 includes an example output 522 of application of the planar bilateral solver as described herein for the image 504 using the raw point cloud 510 and an example output 524 of application of the planar bilateral solver for the image 506 using the raw point cloud 512. As shown by output 524 compared to output 518, the planar bilateral solver resolves the fronto-parallel bias issues and produces significantly improved output, in which the heavily foreshortened walls and floor are more accurately recovered.

Temporal Smoothness, Warm-Start Initialization, and Late-Stage Slicing

To produce a compelling user experience, the depth maps produced by the depth-from-motion pipeline 236 are smoothed over time. This goal of temporal consistency is somewhat at odds with the goal of responsive, low latency output that is tightly aligned to the edges of the current viewfinder frame. The following describes a relatively simple and effective method for the bilateral solver and planar bilateral solver to produce high quality, temporally consistent real-time results.

Conventional approaches for consistency using a bilateral solver include, for example, appending an extra "temporal" dimension to a bilateral solver and solving for the per-pixel depth labeling for an entire video sequence using one instance of the solver. This method produces high-quality results, but is impracticable for a real-time use-case where frames are processed as they are acquired. Accordingly, in at least one embodiment a causal infinite impulse response (IIR)-like approach to temporal smoothness is employed, in which a single bilateral grid of estimated depths is tracked, and in which this bilateral grid is repeated updated using the output of a single-image bilateral solver instance on each incoming frame. This approach can run in real-time, and allows the use of "late stage" slicing to produce low latency edge-aware output, which is highly useful in augmented reality applications.

As explained above, the baseline single-image bilateral solver estimates a depth map by implicitly constructing and solving a linear system $A^{-1}b$ in bilateral space, and then using a "slice matrix" $S^T$ to produce a per-pixel labeling $\hat{x}$:

$$\hat{x} \leftarrow S^T(A^{-1}b)$$

In the temporally consistent solution, an exponential moving average of a bilateral grid of depths $\bar{y}$ is tracked, which is initialized to 0. For each input image t, solve for the current frame's bilateral grid of depths $\hat{y}_t$ by solving a linear system $A_t^{-1}b_t$ and then update $\bar{y}$ using exponential decay. Slicing from that averaged bilateral grid is performed to produce a per-pixel depth estimate. The exact update applied at frame t is:

$$\hat{y}_t \leftarrow A_t^{-1}b_t$$
$$\bar{y} \leftarrow \alpha \, \text{blur}(\bar{y}) + (1-\alpha)\hat{y}_t$$
$$\hat{x}_t \leftarrow S_t^T\left(\frac{\bar{y}}{1-\alpha^t}\right)$$

where $\alpha$ is a parameter that controls how much temporal smoothness is encouraged, blur(•) applies a normalized [1, 4, 6, 4, 1] blur along the three dimensions of the bilateral grid of $\bar{y}$, and the division by $(1-\alpha^t)$ serves to "unbias" the moving average estimate of $\bar{y}$. The blur(•) operator diffuses information spatially between frames, which appears to help, and the linear interpolation according to a diffuses that same information temporally. Tracking a small bilateral grid of depths instead of a large per-pixel depth map has an speed advantage, as each frame's update requires significantly less compute. However, tracking and blurring a bilateral grid of depths in this manner instead of tracking a depth map also means that the temporal smoothing method is invariant to small camera or scene motion, without the need to explicitly estimate per-pixel motion between frames. Similarly, tracking depth in bilateral-space allows for production of low-latency edge-aware depth estimates through a process referred to above and herein as "late-stage slicing": after updating $\bar{y}$, if the viewfinder frame has changed the new frame is used to construct $S_t^T$ and slice out a per-pixel depth labeling. Since slicing is significantly faster than solving, this approach lets production of per-pixel depth maps that are suitably aligned to the current viewfinder frame, thereby enabling compelling and responsive visual effects. This late-stage slicing approach also allows the algorithm to degrade gracefully on handheld user devices with limited compute capability and thus the per-frame depth estimation may take longer than the duration between frames at a given display frame rate. This method thus may be recognized to be analogous to the "time warp" approach used in some virtual reality (VR) applications, though the technique described above uses raw pixel intensities instead of geometric tracking information.

The temporal smoothing approach enables another acceleration, in which a "warm start" of each frame's bilateral solver instance is performed by initializing the bilateral grid being solved for via gradient descent using the previous frame's solution. Since adjacent frames have similar image content, except in the presence of extreme motion, so this approach significantly improves convergence and allows for fewer gradient descent iterations in all but the first image. Thus, the temporal consistency approach generalizes straightforwardly from the regular bilateral solver to the planar bilateral solver. Temporal consistency is applied to the linear systems describing the per-pixel plane fits before the LDL solve step, which produces better results than applying a temporal filter to the estimated depth at each frame. The late-stage slicing also can include a late-stage per-pixel LDL solve, which increases runtimes slightly, but typically not enough to preclude real-time performance.

In accordance with one aspect, a method for providing an augmented reality (AR) experience at a handheld user device includes capturing, via a monocular camera of the handheld user device, a feed of images of a local scene and selecting, from the feed, a keyframe. The method further includes performing, for a first image from the feed of images, stereo matching using the first image, the keyframe, and a relative pose based on a pose associated with the first image and a pose associated with the keyframe to generate a disparity map representing disparities between the first image and the keyframe, and then determining a depth map from the disparity map using a bilateral solver algorithm. The method further includes processing a viewfinder image generated from a second image of the feed with occlusion rendering based on the depth map to incorporate one or more virtual objects into the viewfinder image to generate an AR viewfinder image, and displaying, at the handheld user device, the AR viewfinder image.

In a further aspect, the method further includes polar rectifying the keyframe and the first image, and wherein performing stereo matching comprising performing stereo matching using polar rectified representations of the keyframe and the first image. Determining the depth map can include generating a sparse depth map from the disparity map using triangulation, applying the bilateral solver algorithm to the sparse depth map to generate a grid of depths, and slicing the grid of depths with the second image to generate the depth map. In one aspect, the bilateral solver algorithm comprises a planar bilateral solver algorithm that is based on plane-fitting each pixel in the sparse depth map. Further, in one aspect, selecting the keyframe comprises selecting the keyframe based on minimization of a cost function that implements at least one of: a baseline distance between two candidate frames; a time difference between the capture of two candidate frames; a fractional overlap of image areas of two candidate frames based on viewing frustums; and a measured error of pose-tracking statistics for two candidate frames. In some aspects, the processes of selecting the keyframe, performing stereo matching, determining the depth map, and processing the viewfinder image are performed in real-time by a central processing unit (CPU) of the handheld user device.

In accordance with another aspect, a computer-readable medium stores a set of executable instructions, the set of executable instructions configured to manipulate a processor of a handheld user device to perform the method described above.

In accordance with another aspect, a handheld user device includes a monocular camera to capture a feed of images of a local scene, a display panel, a memory to store a software application, and a processor coupled to the memory and to the monocular camera. The processor is to execute instructions of the software application to select, from the feed, a keyframe, perform, for a first image from the feed of images, stereo matching using the first image, the keyframe, and a relative pose based on a pose associated with the first image and a pose associated with the keyframe to generate a disparity map representing disparities between the first image and the keyframe, determine a depth map from the disparity map using a bilateral solver algorithm, process a viewfinder image generated from a second image of the feed with occlusion rendering based on the depth map to incorporate one or more virtual objects into the viewfinder image to generate an AR viewfinder image, and provide the AR viewfinder image for display at the display panel.

Further, in one aspect, the processor is to execute instructions of the software application further to polar rectify the keyframe and the first image, and wherein the stereo matching uses polar rectified representations of the keyframe and the first image. The processor is to determine the depth map by generating a sparse depth map from the disparity map using triangulation, applying the bilateral solver algorithm to the sparse depth map to generate a grid of depths, and slicing the grid of depths with the second image to generate the depth map. In one aspect, the bilateral solver algorithm comprises a planar bilateral solver algorithm that is based on plane-fitting each pixel in the sparse depth map. In one aspect, the processor is to select the keyframe based on minimization of a cost function that implements at least one of: a baseline distance between two candidate frames; a time difference between the capture of two candidate frames; a fractional overlap of image areas of two candidate frames based on viewing frustums; and a measured error of pose-tracking statistics for two candidate frames. Further, the processor can include a central processing unit (CPU), wherein the CPU is to determine the depth map and process the viewfinder image in real-time. The handheld user device can be, for example, one of a compute-enabled cellular phone, a tablet computer, and a portable gaming device.

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

A computer readable storage medium includes any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for providing an augmented reality (AR) experience at a handheld user device, the method comprising:
   capturing, via the handheld user device, a feed of images of a local scene;
   selecting, from the feed, a keyframe;
   performing, for a first image from the feed of images, stereo matching using the first image, the keyframe, and a relative pose based on a pose associated with the first image and a pose associated with the keyframe to generate a sparse disparity map representing disparities between the first image and the keyframe;
   determining a dense depth map from the disparity map using a bilateral solver algorithm;
   processing a viewfinder image generated from a second image of the feed with occlusion rendering based on the depth map to incorporate one or more virtual objects into the viewfinder image to generate an AR viewfinder image; and
   displaying, at the handheld user device, the AR viewfinder image.

2. The method of claim 1, further comprising:
   polar rectifying the keyframe and the first image; and
   wherein performing stereo matching comprising performing stereo matching using polar rectified representations of the keyframe and the first image.

3. The method of either of claim 1, wherein determining the depth map comprises:
   generating a sparse depth map from the disparity map using triangulation;
   applying the bilateral solver algorithm to the sparse depth map to generate a bilateral grid of depths; and
   slicing the bilateral grid of depths with the second image to generate the depth map.

4. The method of claim 3, wherein the bilateral solver algorithm comprises a planar bilateral solver algorithm that is based on plane-fitting each pixel in the sparse depth map.

5. The method of claim 1, wherein selecting the keyframe comprises:
   selecting the keyframe based on minimization of a cost function that implements at least one of: a baseline distance between two candidate frames, a time difference between the capture of two candidate frames, a fractional overlap of image areas of two candidate frames based on viewing frustums, and a measured error of pose-tracking statistics for two candidate frames.

6. The method of claim 1, wherein selecting the keyframe, performing stereo matching, determining the depth map, and processing the viewfinder image are performed in real-time by a central processing unit (CPU) of the handheld user device.

7. A handheld user device, comprising:
   a monocular camera to capture a feed of images of a local scene;
   a display panel;
   a memory to store a software application; and
   a processor coupled to the memory and to the monocular camera, wherein the processor is to execute instructions of the software application to:
      select, from the feed, a keyframe;
      perform, for a first image from the feed of images, stereo matching using the first image, the keyframe, and a relative pose based on a pose associated with the first image and a pose associated with the keyframe to generate a sparse disparity map representing disparities between the first image and the keyframe;
      determine a dense depth map from the disparity map using a bilateral solver algorithm;
      process a viewfinder image generated from a second image of the feed with occlusion rendering based on the depth map to incorporate one or more virtual objects into the viewfinder image to generate an AR viewfinder image; and
      provide the AR viewfinder image for display at the display panel.

8. The handheld user device of claim 7, wherein the processor is to execute instructions of the software application further to:
   polar rectify the keyframe and the first image; and
   the stereo matching uses polar rectified representations of the keyframe and the first image.

9. The handheld user device of claim 7, wherein the processor is to determine the depth map by:
   generating a sparse depth map from the disparity map using triangulation;
   applying the bilateral solver algorithm to the sparse depth map to generate a bilateral grid of depths; and
   slicing the bilateral grid of depths with the second image to generate the depth map.

10. The handheld user device of claim 9, wherein the bilateral solver algorithm comprises a planar bilateral solver algorithm that is based on plane-fitting each pixel in the sparse depth map.

11. The handheld user device of claim 7, wherein the processor is to select the keyframe based on minimization of a cost function that implements at least one of: a baseline distance between two candidate frames; a time difference between the capture of two candidate frames; a fractional overlap of image areas of two candidate frames based on viewing frustums; and a measured error of pose-tracking statistics for two candidate frames.

12. The handheld user device of claim 7, wherein the processor is a central processing unit (CPU).

13. The handheld user device of claim 12, wherein the CPU is to determine the depth map and process the viewfinder image in real-time.

14. The handheld user device of claim 7, wherein the handheld user device is one of a compute-enabled cellular phone, a tablet computer, and a portable gaming device.

15. A non-transitory computer-readable storage medium storing a set of executable instructions, the set of executable instructions configured to manipulate a processor of a handheld user device to:
  select a keyframe from a feed of images captured by a monocular camera;
  perform, for a first image from the feed of images, stereo matching using the first image, the keyframe, and a relative pose based on a pose associated with the first image and a pose associated with the keyframe to generate a sparse disparity map representing disparities between the first image and the keyframe;
  determine a dense depth map from the disparity map using a bilateral solver algorithm;
  process a viewfinder image generated from a second image of the feed with occlusion rendering based on the depth map to incorporate one or more virtual objects into the viewfinder image to generate an AR viewfinder image; and
  provide the AR viewfinder image for display at a display panel of the handheld user device.

16. The non-transitory computer-readable storage medium of claim 15, wherein the executable instructions are configured to manipulate the processor further to:
  polar rectify the keyframe and the first image; and
  the stereo matching uses polar rectified representations of the keyframe and the first image.

17. The non-transitory computer-readable storage medium of claim 15, wherein the executable instructions are to manipulate the processor to determine the depth map by:
  generating a sparse depth map from the disparity map using triangulation;
  applying the bilateral solver algorithm to the sparse depth map to generate a bilateral grid of depths; and
  slicing the bilateral grid of depths with the second image to generate the depth map.

18. The non-transitory computer-readable storage medium of claim 17, wherein the bilateral solver algorithm comprises a planar bilateral solver algorithm that is based on plane-fitting each pixel in the sparse depth map.

19. The non-transitory computer-readable storage medium of claim 15, wherein the processor is to select the keyframe based on minimization of a cost function that implements at least one of: a baseline distance between two candidate frames; a time difference between the capture of two candidate frames; a fractional overlap of image areas of two candidate frames based on viewing frustums; and a measured error of pose-tracking statistics for two candidate frames.

20. The non-transitory computer-readable storage medium of claim 15, wherein the processor is a central processing unit (CPU).

* * * * *